(12) United States Patent
Inazu et al.

(10) Patent No.: US 7,393,005 B2
(45) Date of Patent: Jul. 1, 2008

(54) SEAT FOR VEHICLE USE

(75) Inventors: Tadashi Inazu, Wako (JP); Takashi Nakamura, Wako (JP); Tatsuya Terauchi, Wako (JP); Takashi Honda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/338,555

(22) Filed: Jan. 24, 2006

(65) Prior Publication Data
US 2006/0163850 A1 Jul. 27, 2006

(30) Foreign Application Priority Data
Jan. 25, 2005 (JP) .............................. 2005-016961

(51) Int. Cl.
*B60R 21/16* (2006.01)
(52) U.S. Cl. ............... 280/730.2; 280/728.2; 280/728.3
(58) Field of Classification Search .............. 280/728.2, 280/728.3, 730.2
See application file for complete search history.

(56) References Cited

U.S. PATENT DOCUMENTS

| | | | | | |
|---|---|---|---|---|---|
| 5,498,030 A | * | 3/1996 | Hill et al. | .................. | 280/743.1 |
| 5,651,582 A | * | 7/1997 | Nakano | .................. | 297/216.13 |
| 6,045,151 A | * | 4/2000 | Wu | .......................... | 280/728.3 |
| 6,217,062 B1 | * | 4/2001 | Breyvogel et al. | ........ | 280/730.2 |
| 6,237,934 B1 | * | 5/2001 | Harrell et al. | ............. | 280/728.3 |
| 6,386,577 B1 | * | 5/2002 | Kan et al. | ................. | 280/730.2 |
| 6,450,528 B1 | * | 9/2002 | Suezawa et al. | .......... | 280/730.2 |
| 6,457,741 B2 | * | 10/2002 | Seki et al. | ................. | 280/730.2 |
| 6,592,144 B2 | * | 7/2003 | Acker et al. | ............. | 280/730.2 |
| 6,612,610 B1 | * | 9/2003 | Aoki et al. | ................ | 280/730.2 |
| 7,134,686 B2 | * | 11/2006 | Tracht et al. | ............. | 280/730.2 |
| 2005/0156412 A1 | * | 7/2005 | Panagos et al. | .......... | 280/730.2 |

FOREIGN PATENT DOCUMENTS

| | | |
|---|---|---|
| CN | 1071648 C | 5/1997 |
| JP | 9-104316 | 4/1997 |
| JP | 9-323606 | 12/1997 |
| JP | 11-59312 | 3/1999 |
| WO | 97/45297 | 12/1997 |

* cited by examiner

*Primary Examiner*—Toan C To
(74) *Attorney, Agent, or Firm*—Rankin, Hill & Clark LLP

(57) ABSTRACT

In a back portion of a seat back provided with a lumbar support portion 20 and a side support portion 21, a seat back cover 30 for covering a back face of the seat back is provided. The seat back cover 30 is provided with a side portion 32 for covering an air bag module 50 by making a forward end portion, which is extended to the front side of a vehicle, come into contact with the side support portion 21. The side support portion 21 is provided being capable of oscillating to the front side of the vehicle with respect to the lumbar support 20. An air bag module 50 is arranged in an accommodation space 90 provided on the rear side of the side support portion 21.

7 Claims, 6 Drawing Sheets

SEAT FOR VEHICLE USE

BACKGROUND OF THE INVENTION

The present invention relates to a seat for vehicle use integrated with an air bag.

A seat for vehicle use is well known which is integrated with a side air bag deploying to the side of a passenger at the time of collision of a vehicle. For example, Patent Document JP-A-9-104316 discloses the following seat for vehicle use. A seat back board covering a back of the seat back is provided being extended to a side of the seat. An air bag device is accommodated in an end portion of an accommodation space formed between the seat back and the seat back board. The seat back board covers an air bag device, and a side plate portion of the seat back board is opened outside by the developing pressure of the air bag so that the air bag can be protruded from the seat back.

Further, Patent Document JP-A-9-323606 discloses the following seat for vehicle use. An air bag device is integrated in a seat bag. A specific seam of the seat back is ruptured by the developing pressure of the air bag so that the air bag can be protruded from the seat back.

Furthermore, Patent Document JP-A-11-59312 discloses the following seat for vehicle use. An air bag unit, which is housed in a case and formed into a unit, is arranged inside a side portion of a seat back. This air bag unit is covered with a covering material. A lid portion of the case is released by the developing pressure of the air bag so as to rupture a seam formed between the seat back and the covering material. The air bag is protruded from the seat back.

However, according to the seat for vehicle use described in Patent Document JP-A-9-104316, the following problems may be encountered. Since the air bag is protruded from the opening formed when the side plate portion of the seat back board is opened outside, the air bag is deployed to the side of the seat.

According to the seat for vehicle use described in Patent Document JP-A-9-323606, the following problems may be encountered. Although the air bag can be properly deployed, the structure of the seam capable of being ruptured by the developing pressure of the air bag is complicated. Therefore, the manufacturing cost is raised.

According to the seat for vehicle use described in Patent Document JP-A-11-59312, the following problems may be encountered. It is necessary to form the seam, which is formed between the seat bag and the covering material, so that it can be ruptured by the developing pressure of the air bag. Therefore, the seam structure becomes complicated and the manufacturing cost is raised.

SUMMARY OF THE INVENTION

Therefore, the present invention provides a seat for vehicle use which is integrated with an air bag, capable of properly deploying. In addition, the structure of the seat for vehicle use is simple and the manufacturing cost is inexpensive.

In order to solve the above problems, the invention provides the following seat for vehicle use. A seat back cover (for example, the seat back cover 30 in the embodiment described later) for covering a back of the seat back is provided in a back portion of the seat back (for example, the seat back 3 in the embodiment described later). An accommodation space (for example, the accommodation space 90 in the embodiment described later) is formed between the seat back and the seat back cover, an air bag module (for example, the air bag module 50 in the embodiment described later) in which an air bag (for example, the air bag 51 in the embodiment described later) is folded is arranged in the accommodation space. In the above seat for vehicle use (for example, the seat 1 for vehicle use in the embodiment described later) which is integrated with the air bag, the seat back cover includes: a side portion (for example, the side portion 32 in the embodiment described later) for covering the air bag module when a forward end portion extending to the front side of the vehicle is made to come close to the seat back; a lumbar support portion (for example, the lumbar support portion 20 in the embodiment described later) for supporting a back portion of a passenger; and a side support portion (for example, the side support portion 21 in the embodiment described later) for supporting a side of the lumbar of the passenger. The air bag module is arranged on the rear side of the side support portion in the accommodation space, and the side support portion is oscillated to the front of a vehicle so as to open a portion between the cover portion and the side cover portion by a development pressure of the air bag in the air bag module.

Due to the above structure, when the side support portion is oscillated to the front side of the vehicle by the developing pressure of the air bag, an opening is formed between the side portion of the seat back cover and the side support portion, and the air bag can be protruded from this opening. Therefore, the air bag can be properly developed. In this structure, the opening is not formed by the rupture of a seam. This point is unlike the prior art. Therefore, the structure can be made simple and the manufacturing cost can be reduced.

The invention provides a seat for vehicle use, wherein the air bag module is arranged inside an air bag holding member (for example, the support plate 60 in the embodiment described later), the cross section of which is a substantial U-shape, the front side of the U-shaped air bag holding member is open, and the air bag module is arranged in the accommodation space together with the air bag holding member.

Due to the above structure, it is possible for the air bag to protrude from the open end of the air bag holding member to the front side of the vehicle.

The invention provides a seat for vehicle use, further including: a protruding portion (for example, the protruding portion 34 in the embodiment described later) protruding to the front side of the vehicle provided inside of the side portion of the seat back cover portion, a folding back portion (for example, the folding back portion 68 in the embodiment described later), which is folded back to the rear side of the vehicle, provided in an outside end portion of the air bag holding member. The protruding portion is engaged with the folding back portion.

Due to the above structure, even when the developing pressure of the air bag is given to the air bag holding member and the seat back cover, since the protruding portion of the seat back cover is engaged with the folding back portion of the air bag holding member, the air bag holding member and the seat back cover are not separated from each other. Further, since the folding back portion is arranged in the outside end portion of the air bag holding member, it is possible to prevent the air bag from being damaged at the time of developing.

The present invention teaches that the air bag is integrated with the seat for vehicle use and can be properly developed. Further, the structure of the seat for vehicle use, which is integrated with the air bag, can be made simple and the manufacturing cost can be reduced.

In addition, the air bag can be protruded from the open end of the air bag holding member to the front side of the vehicle. Therefore, the protruding direction of the air bag can be specified.

Furthermore, even when the developing pressure of the air bag is given to the air bag holding member and the seat back cover, the air bag holding member and the seat back cover are not separated from each other. By the folding back portion of the air bag holding member, the air bag can be prevented from being damaged at the time of developing.

DETAILED DESCRIPTON OF THE PREFERRED EMBODIMENTS

Referring to FIGS. 1 to 6, an embodiment of the seat for vehicle use of the present invention will be explained below. In this connection, the seat for vehicle use of this embodiment is an assistant driver's seat of a right steering wheel vehicle (that is, a left front seat of a right steering wheel vehicle).

Figure 1:
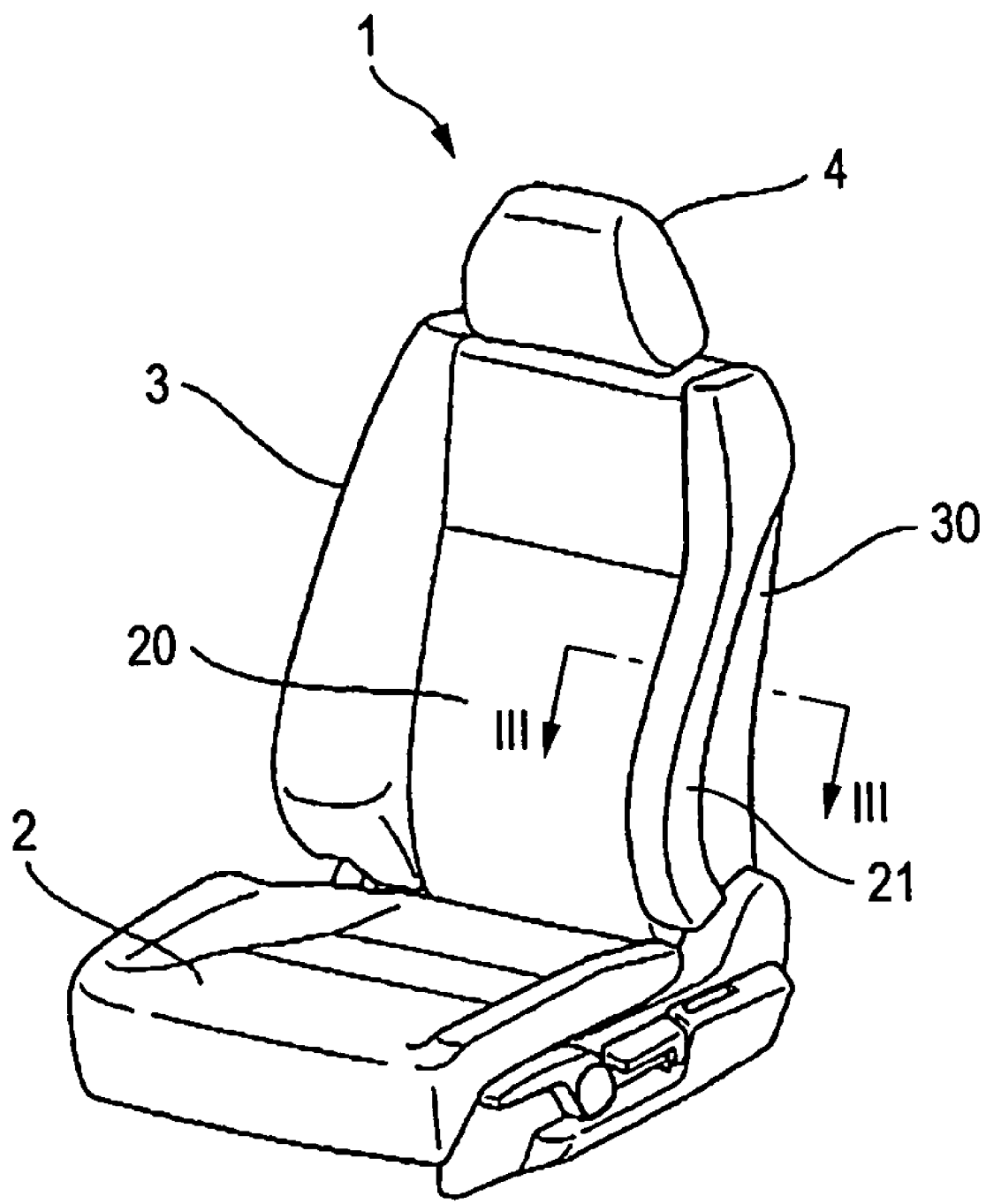
FIG. 1 is a perspective view showing an appearance of the seat for vehicle use of the present invention.

As shown in FIG. 1, this assistant driver's seat 1 includes: a seat cushion 2 for holding the hip portion of a passenger; a seat back 3 for holding the waist portion and the back portion of the passenger; and a head rest 4 for holding the head portion of the passenger. The seat cushion 2 is attached to a vehicle body (not shown) so that it can be moved in the longitudinal direction. The seat back 3 is attached to the seat cushion 2 so that the seat back 3 can be tilted in the longitudinal direction of the vehicle. The head rest 4 is attached to the seat back 3 so that the head rest 4 can be moved in the vertical direction.

The seat back 3 includes: a seat back frame 10 (shown in FIG. 2); a lumbar support portion 20 attached to the seat back frame 10, for mainly holding the back portion of the passenger; a side support portion 21 attached to the seat back frame 10, for mainly holding the waist side portion of the passenger; and a seat back cover 30 for covering the back face of the lumbar support portion 20 and the side of the side support portion 21.

Figure 3:
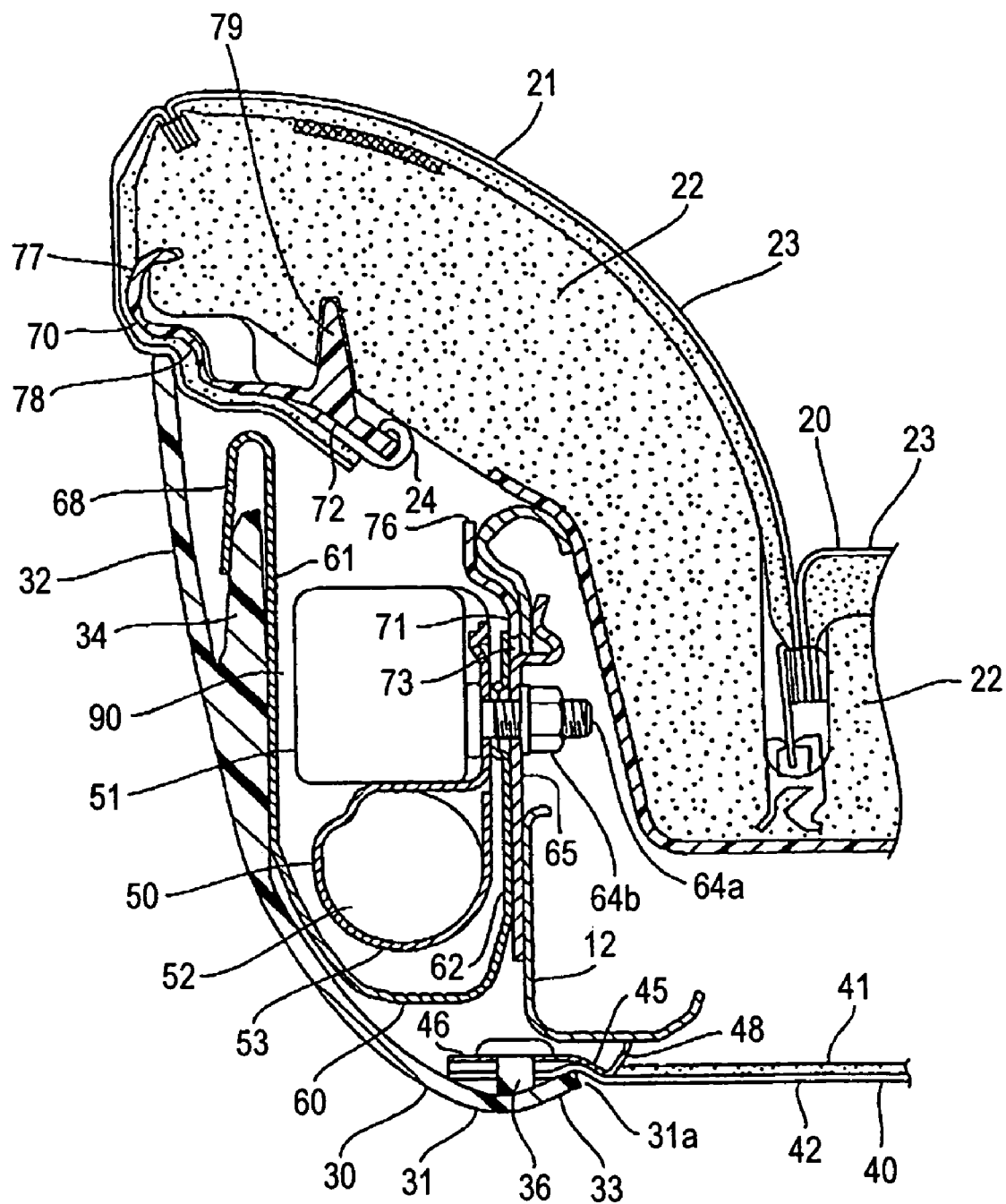
FIG. 3 is a sectional view taken on line III-III in FIG. 1.

As shown in FIG. 3, in the lumbar support portion 20 and the side support portion 21, a surface of the cushion body 22 is covered with the covering material 23. The side support portion 21 is formed in such a manner that the side support portion 21 is extended obliquely outside when it proceeds from both side portions of the lumbar support portion 20 to the front side of the vehicle. This side support portion 21 can be oscillated to the front side of the vehicle with respect to the lumbar support portion 20.

Figure 2:
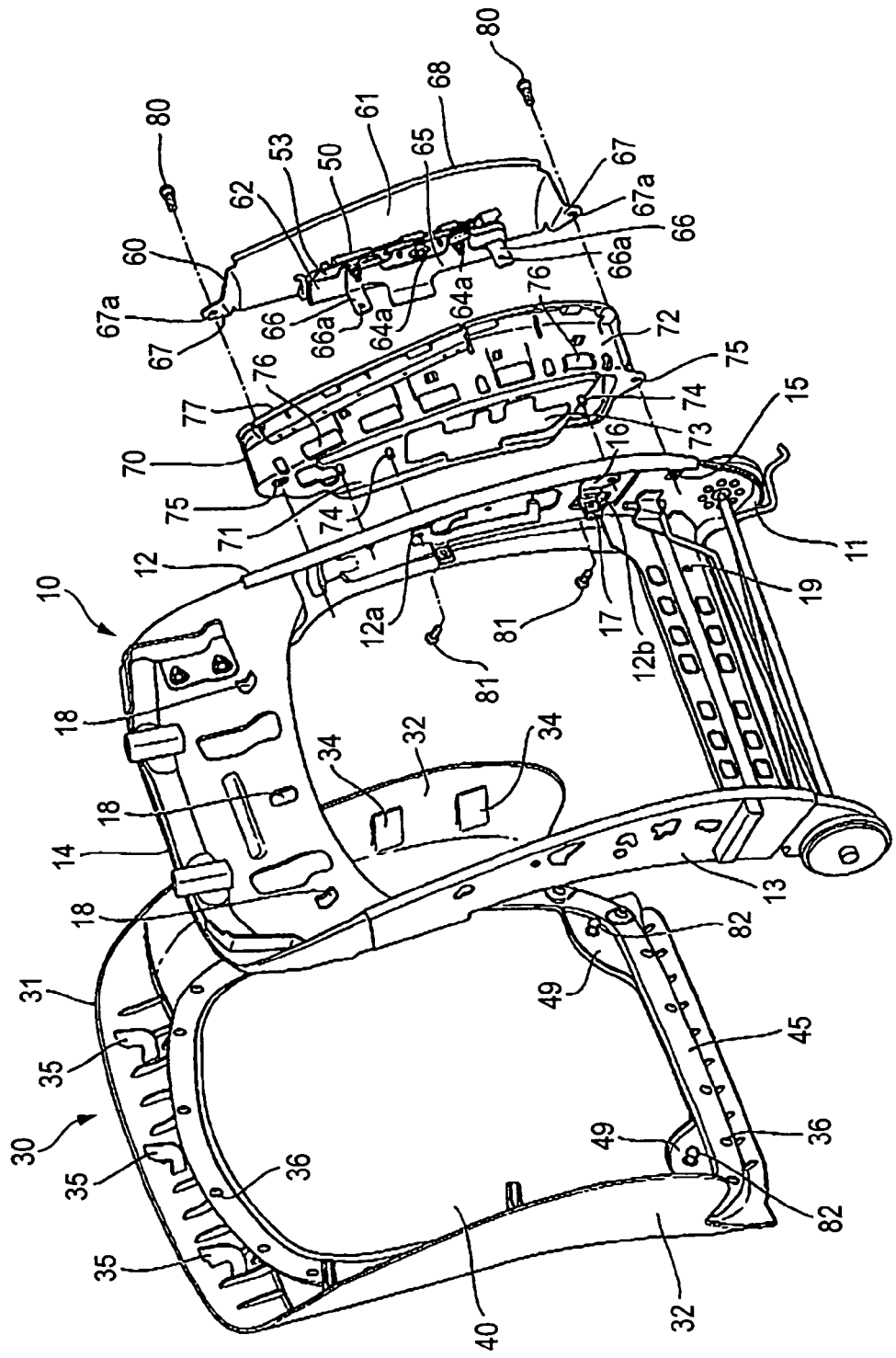
FIG. 2 is an exploded perspective view showing a seat back of the seat.

As shown in FIG. 2, the seat back frame 10 includes: a lower frame 11 pivotally supported by the seat cushion frame (not shown) of the seat cushion 2; a pair of side frames 12, 13 fixed to both end portions of the lower frame 11 and extended upward; and an upper frame 14 for connecting upper end portions of the side frames 12, 13.

In this seat 1 arranged on the left of the front seat of the vehicle, the side air bag module 50, which will be only referred to as an air bag module hereinafter, is attached to the side portion of the left side frame 12. As shown in FIG. 3, in the air bag module 50, the air bag 51, which is folded before development, and an inflater 52, which generates gas used for developing the air bag, are held by the retainer 53. As shown in FIG. 2, the air bag module 50 is attached to the side frame 12 via the support plate (the air bag holding member) 60 and the module holder 70.

The support plate 60 is formed by conducting press forming on a metallic plate. As shown in FIG. 3, the cross section of the support plate 60 is formed into a substantial U-shape, the front side with respect to the vehicle of which is open. On the support plate 60, the left arm portion 61, which is arranged outside of the vehicle, is protruded more than the right arm portion 62 which is arranged inside of the vehicle. The length in the vertical direction of the left arm portion 61 is longer than the length in the vertical direction of the right arm portion 62. The air bag module 50 is accommodated between the left arm portion 61 and the right arm portion 62. The retainer 53 is fixed to the right arm portion 62 by the bolt 64a and the nut 64b.

The bracket 65 made of metal is also fastened to the outer face of the right arm portion 62 by the bolt 64a and the nut 64b for fixing the retainer 53. As shown in FIG. 2, the bracket 65 includes two flange portions 66 which rise in the direction in which the flange portions 66 comes close to the seat back frame 10.

At the upper and lower end portions of the left arm portion 61, the flange portions 67 respectively having the screw insertion hole 67a are provided. At the front end portion of the left arm portion 61, the folding back portion 68 (shown in FIG. 3), which is folded back to the outside, the rear side being formed into a U-shape, is formed.

The module holder 70 is made of resin. As shown in FIG. 2, the module holder 70 includes: a base portion 71 arranged along the side frame 12; and a wing portion 72 bent from the forward end portion of the base portion 71 and extended obliquely outside when the wing portion 72 proceeds to the front side of the vehicle. The base portion 71 includes: a bracket accommodation hole 73 into which the bracket 65 is inserted; a plurality of guide pins 74 protruding to the side frame 12 side; and a screw insertion hole 75 arranged corresponding to the screw insertion hole 67a of the support plate 60. In the neighborhood of the connecting portion of the wing portion with the base portion 71, a large number of rectangular holes 76 are provided. As shown in FIG. 3, the front end portion of the wing portion 72 is bent inside into a C-shape so that it can be formed into an engaging pawl 77. Further, as shown in FIG. 3, at an appropriate portion on the rear face of the wing portion 72, the engaging pawl 79 is arranged being protruded to the side guide support portion 21 side.

This module holder 70 is positioned when the guide pin 74 is inserted into the guide hole 12a provided in the side frame 12.

As shown in FIG. 2, outside the module holder 70, the support plate 60, to which the air bag module 50 and the bracket 65 are attached, is arranged. The bracket 65 comes into contact with the side frame 12 inserted into the bracket accommodation hole 73 of the module holder 70. The flange portion 66 of the bracket 65 is inserted into the insertion hole 12b formed in the side frame 12. The right arm portion 62 of the support plate 60 protruding outside from the bracket 65 comes into contact with the base portion 71 of the module holder 70.

The bolt 80 is inserted into the screw insertion holes 67a, 75 of the support plate 60 and the module holder 70 from the outside of the support plate 60 and screwed to the nut 15 which is welded and fixed to the side frame 12. The bolt 81 is inserted into the screw insertion hole 66a of the flange portion 66 of the support plate 60 and screwed to the nut 17 which is welded and fixed to the support 16 provided in the side frame 12. Due to the foregoing, the support plate 60 and the module holder 70 are fixed to the side frame 12 of the seat back frame 10.

As shown in FIG. 3, the back face of the side support portion 21 is arranged along the wing portion 72 of the module holder 70. The engaging pawls 77, 79 of the module holder 70 bite into the side face and the rear face of the cushion body 22 of the side support portion 21. The hook 24 provided in the end portion of the covering material 23 of the side support portion 21 is engaged in the rectangular hole 76 of the wing portion 72. Due to the above structure, the forward end portion of the side support portion 21 and the wing portion 72 of the module holder 70 are integrated with each other into one body.

Figure 5:
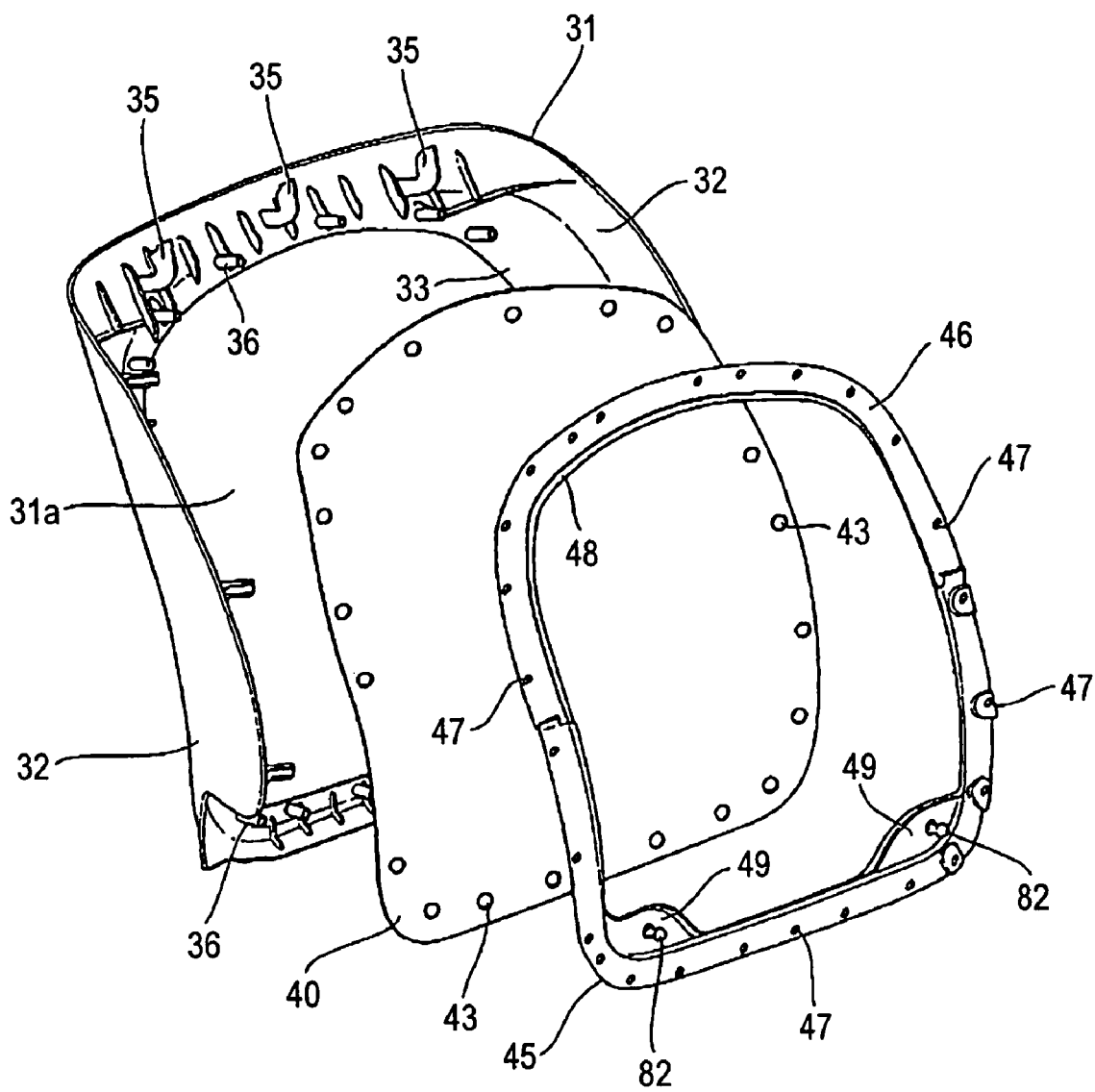
FIG. 5 is an exploded perspective view showing a seat back cover of the seat back.

As shown in FIG. 5, the seat back cover 30 includes: a frame 31, the shape of which is annular because the large opening 31a is formed at the center; a cover sheet 40 for closing the opening 31a; and a plate 45 for fixing the cover sheet 40 to the frame 31.

The frame 31 is made of resin. At both end portions of the frame 31, the side portions 32 are provided which extend to the front side of the vehicle when the side portions 32 are separated outside from the opening 31a. As shown in FIG. 3, the side portion 32 extends to the front side from the peripheral edge portion 33, which forms a peripheral edge of the opening 31a, while curving outside. Then, the side portion 32 passes through the outside of the support plate 60, and the forward end is made to collide with the forward back face of the side support portion 21. The covering material 23 of the side support portion 21 is provided between the step portion 78, which is formed on the base portion side of the engaging pawl 77 of the module holder 70, and the side portion 32.

As shown in FIGS. 2 and 3, in the frame 31, a plurality of protruding portions 34 are protruded inside the side portion 32 on the left toward the front side of the vehicle. When the forward end portion of this protruding portion 34 is engaged with the inside of the folding back portion 68 of the support plate 60, the protruding portion 34 can be engaged with the folding back portion 68. As shown in FIGS. 2 and 5, in the upper portion of the frame 31, three hooks 35, which are substantially L-shaped, the forward end portions of which are extended upward, are provided. These hooks 35 are inserted into and engaged with the holes 18 formed in the upper frame 14 of the seat back frame 14. A large number of pins 36 are arranged in the peripheral edge portion 33 of the frame 31 at predetermined intervals.

As shown in FIG. 3, the cover sheet 40 is formed in such a manner that the outer layer 42 covers the foam 41. As shown in FIG. 5, in the outer circumferential portion of the cover sheet 40, a large number of attaching holes 43 for inserting the pins 36 of the frame 31 are arranged at predetermined intervals.

Figure 6:
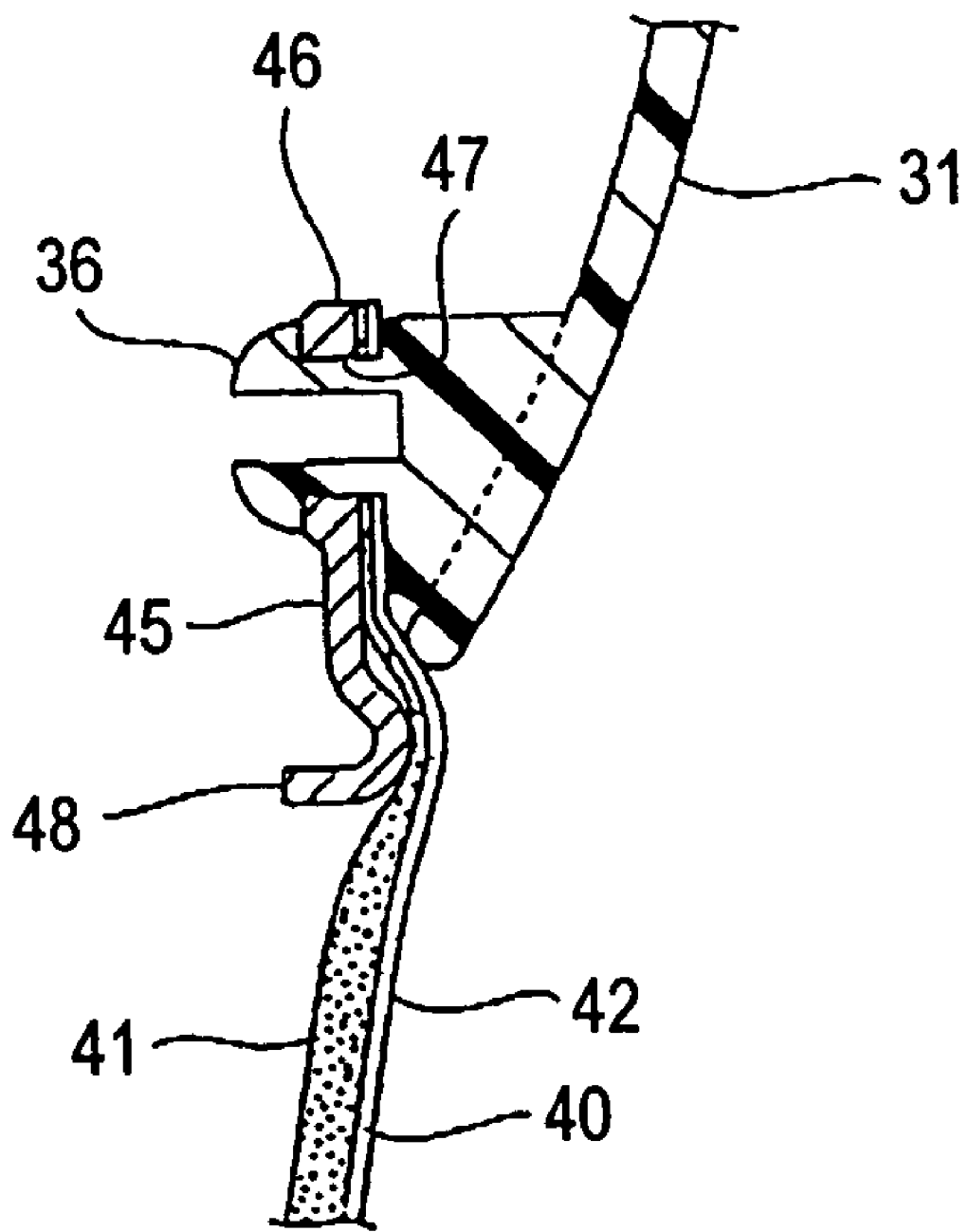
FIG. 6 is a sectional view showing a primary portion of the seat back cover.

The plate 45 is formed by conducting press-forming on a metallic plate. As shown in FIG. 5, the plate 45 is formed into an annular shape. In the outer peripheral portion 46 of the plate 45, a large number of attaching holes 47 for inserting the pins 36 of the frame 31 are provided at predetermined intervals. As shown in FIG. 6, the inner circumferential portion 48 of the plate 45 is bent so that the cross section can be formed into a substantial J-shape. The forward end portion of the inner circumferential portion 48 of the plate 45 is protruded to the front side of the vehicle more than the outer circumferential portion 46. In the flange portion 49 formed in the lower side corner portion of the outer circumferential portion 46, the clip 82 made of resin protruding to the front side of the vehicle is fixed. In this connection, it is possible to replace the plate 45 with a resin molding such as an injection molding of polypropylene.

The cover sheet 40 is interposed between the frame 31 and the plate 45. The structure will be described in detail as follows. When the pins 36 of the frame 31 are inserted into the attaching holes 43 of the cover sheet 40, the cover sheet 40 is attached to the frame 31. When the pins 36 of the frame 31 are inserted into the attaching holes 47 of the plate 45, the plate 45 can be attached to the frame 31. After the cover sheet 40 and the plate 45 are attached, as shown in FIG. 6, the forward end portions of the pins 36 are caulked by means of ultrasonic deposition. In this way, the cover sheet 40 can be interposed between the frame 31 and the plate 45.

The seat back cover 30 can be fixed to the seat back frame 10 as follows. After the hooks 35 of the frame 31 are inserted into the holes 18 of the seat back frame 10, the seat back cover 30 is lifted upward and the hooks 35 are engaged with the upper frame 14. Under this condition, the clips 82 provided on the plate 45 are engaged in the engaging holes 19 provided in the lower frame 11 of the seat back frame 10. In this way, the seat back cover 30 can be fixed to the seat back frame 10. Under the condition in which the seat back frame 10 is attached as described above, as shown in FIG. 3, the forward end portion of the inner circumferential portion 48 of the plate 45 of the seat back cover 30 elastically comes into pressure contact with the rear face of the seat back frame 10. As a result, the forward end portion of the side portion 32 comes into pressure contact with the covering material 23 of the side port portion 21.

In the seat 1 formed as described above, the accommodation space 90, in which the air bag module 50 is accommodated, is formed in a space between the seat back 3 and the seat back cover 30, which includes the lumbar support portion 20 and the side support portion 21, and at the rear of the side support portion 21. The support plate 60 is arranged together with the air bag module 50 in this accommodation space 90. The side portion 32 of the seat back cover 30 covers the air bag module 50.

Next, the action of this seat 1 will be explained below.

Figure 4:
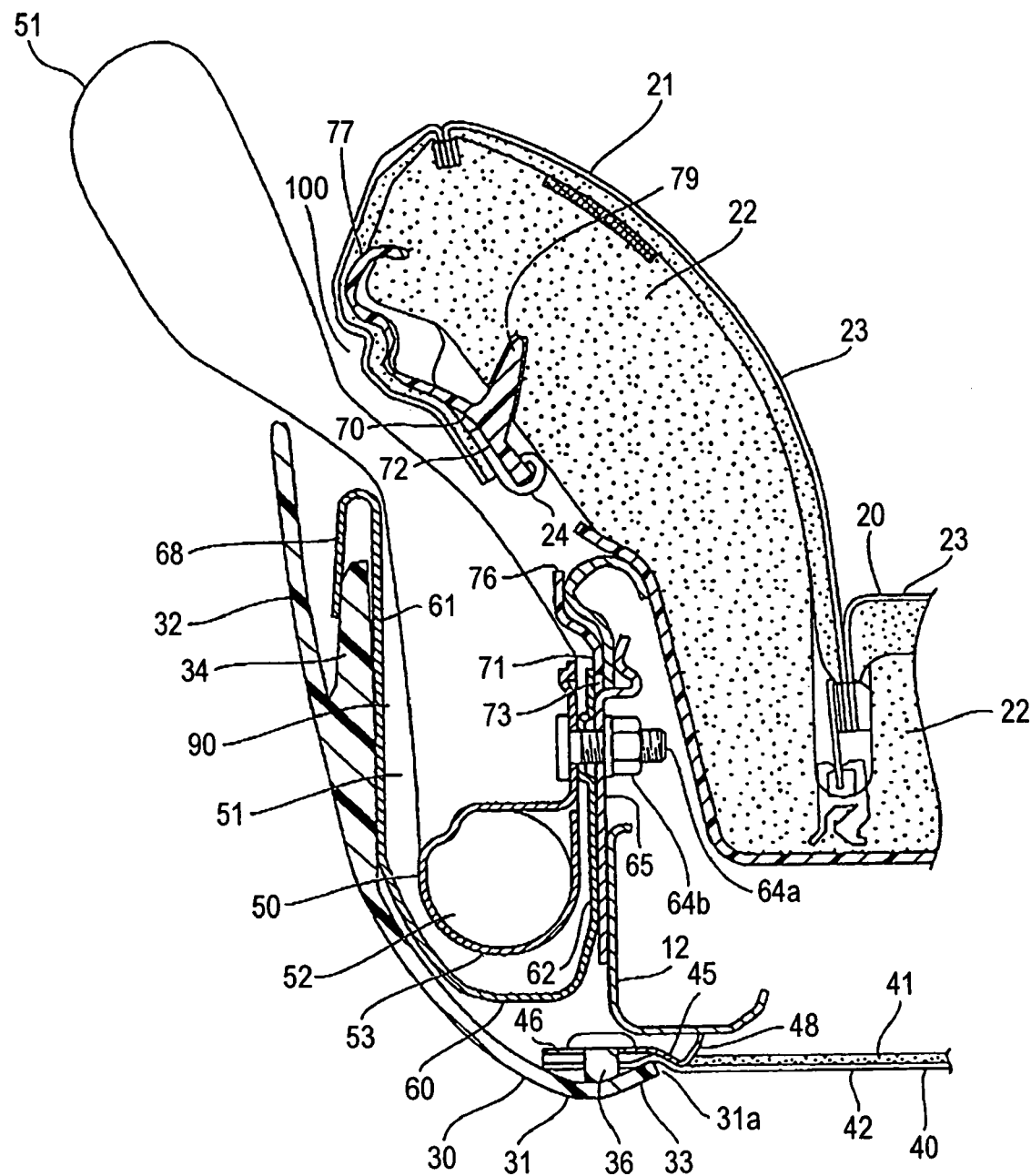
FIG. 4 is a sectional view corresponding to FIG. 3 showing a seat back at the time of the development of an air bag.

In this seat 1, gas, which is generated by the inflater 52 at the time of car collision, expands and develops the air bag 51. Since the support plate 60 opens on the front side of the vehicle, the developing direction of the air bag 51 is restricted in the direction of the front of the vehicle. The developing pressure of the air bag 51 acts on the side support portion 21 via the wing portion 72 of the module holder 70 and also acts on the side portion 32 of the frame 31 of the seat back cover 30 via the left arm portion 61 of the support plate 60. As a result, as shown in FIG. 4, the wing portion 72 and the side support portion 21 are oscillated to the front side of the vehicle. Therefore, the forward end portion of the side portion 32 and the side support portion 21 are separated from each other and opened. When the air bag 51 protrudes from this passage area 100 to the front side of the vehicle, the air bag 51 develops to the side portion of a passenger who takes a seat in the seat 1 so that the passenger can be protected from collision.

As described above, in this seat 1, the passage area 100 for protruding the air bag 51 from the seat 1 is not formed by rupturing the seam of the seat. This point is unlike the prior art. Therefore, the seat structure can be made simple and the manufacturing cost can be reduced.

In this case, the side support portion 21 is oscillated by the developing pressure of the air bag 51. However, in order to oscillate the side portion 32 outside, the left arm portion 61 of the support plate 60 made of metal must be oscillated. Therefore, compared with the case in which the side support portion 21 is oscillated to the front side, the side support portion 21 is more easily oscillated than the side portion 32. Accordingly, since the side support portion 21 is greatly oscillated, the air bag 51 can be easily protruded to the front side of the vehicle and prevented from extending to the side of the vehicle. Therefore, the air bag 51 can be properly developed into the region necessary for protecting the passenger.

At the forward end of the left arm portion 61 of the support plate 60, the folding back portion 68, which is folded back outside, is provided. Therefore, at the time of developing the air bag 51, there is no possibility that the air bag 51 is damaged by the support plate 60.

Further, the protruding portion 34 provided inside the side portion 32 is engaged with the folding back portion 68 of the support plate 60. Accordingly, even when the side portion 32 is oscillated outside at the time of developing of the air bag 51, the engagement state can be maintained. Therefore, the support plate 60 and the frame 31 of the seat back cover 30 are not separated from each other but prevented from being detached from the seat back frame 10.

In this connection, the present invention is not limited to the above specific embodiment.

For example, in the above embodiment, the present invention is applied to an assistant driver's seat. However, the present invention can be applied to various seats such as a driver's seat and a rear passenger's seat.

What is claimed is:

1. A seat with an integrated air bag for a vehicle, in a seat back of the seat an accommodation space is formed, an air bag module, in which the air bag is folded, being arranged in the accommodation space, the seat back comprising:
    a side cover portion for covering the air bag module and defining a side of the seat back;
    a lumbar support portion for supporting a back portion of a passenger; and
    a side support portion for supporting a side of a lumbar of the passenger, wherein an end of said side cover portion is normally in engagement with said side support portion, said side support portion cooperating with the side cover portion to define a passageway in communication with said accommodation space and leading to an area of engagement between said side cover portion and said side support portion, wherein
        the air bag module is arranged on a rear side of the side support portion in the accommodation space,
        the side support portion is oscillated toward a front of the vehicle and away from said side cover portion, which remains generally stationary with respect to the vehicle, such that said side support portion disengages and separates from the side cover portion to create an opening in communication with said passageway by a development pressure of the air bag in the air bag module,
        the air bag module is arranged inside an air bag holding member, a cross section of which is substantially U-shaped with a left arm portion and a right arm portion, the front side of the U-shaped air bag holding member is open, and
        the air bag module is arranged in the accommodation space together with the air bag holding member.

2. The seat with the integrated air bag according to claim 1, further comprising:
    a protruding portion protruding toward the front of the vehicle, provided inside of a side portion of the side cover portion,
    a folding back portion, which is folded back to a rear side of the vehicle, provided in an outside end portion of the air bag holding member, wherein the protruding portion is engaged with the folding back portion.

3. The seat with the integrated air bag according to claim 1, wherein the air bag holding member is substantially unchanged in shape after exposure to the development pressure of the air bag.

4. The seat with the integrated air bag according to claim 1, wherein the left arm portion is substantially vertical after exposure to the development pressure of the air bag.

5. The seat with the integrated air bag according to claim 1, wherein the right arm portion is substantially vertical after exposure to the development pressure of the air bag.

6. The seat with the integrated air bag according to claim 1, wherein after exposure to the development pressure of the air bag, the side support portion is separated from the side cover portion in a nondestructive fashion.

7. A seat with an integrated air bag for a vehicle, in a seat back of which an accommodation space is formed, an air bag module, in which the air bag is folded, being arranged in the accommodation space, the seat back comprising:
    a cover portion for covering the air bag module;
    a lumbar support portion for supporting a back portion of a passenger;
    a side support portion for supporting a side of a lumbar of the passenger, wherein
        the air bag module is arranged on a rear side of the side support portion in the accommodation space inside an air bag holding member, said air bag holding member having a generally U-shaped cross sectional shape, wherein a front side of the U-shaped air bag holding member is open and the air bag module is arranged in the accommodation space together with the air bag holding member,
        the side support portion is oscillated to a front of the vehicle so as to open a portion between the cover portion and the side support portion by a development pressure of the air bag in the air bag module;
    a protruding portion extending toward the front of the vehicle provided inside of a side portion of the cover portion; and
    a folding back portion, which is folded back to a rear side of the vehicle, provided in an outside end portion of the air bag holding member, wherein the protruding portion is engaged with the folding back portion.

* * * * *